US012776743B2

(12) United States Patent
Kufner et al.

(10) Patent No.: US 12,776,743 B2
(45) Date of Patent: Oct. 27, 2026

(54) TRACKING DEVICE FOR SOLAR PANELS

(71) Applicant: IDEEMATEC Deutschland GmbH, Wallerfing (DE)

(72) Inventors: Johann Kufner, Aholming (DE); Tobias Himmeter, Tittling (DE)

(73) Assignee: IDEEMATEC Deutschland GmbH, Wallerfing (DE)

( * ) Notice: Subject to any disclaimer, the term of this patent is extended or adjusted under 35 U.S.C. 154(b) by 0 days.

(21) Appl. No.: 18/694,357

(22) PCT Filed: Sep. 6, 2022

(86) PCT No.: PCT/IB2022/058350
§ 371 (c)(1),
(2) Date: Mar. 21, 2024

(87) PCT Pub. No.: WO2023/047221
PCT Pub. Date: Mar. 30, 2023

(65) Prior Publication Data

US 2024/0396491 A1 Nov. 28, 2024

(30) Foreign Application Priority Data

Sep. 21, 2021 (EP) .................................... 21198057

(51) Int. Cl.
*H02S 20/32* (2014.01)

(52) U.S. Cl.
CPC .................................... *H02S 20/32* (2014.12)

(58) Field of Classification Search
CPC ................................................. H02S 20/00–32
(Continued)

(56) References Cited

U.S. PATENT DOCUMENTS

2014/0150845 A1 6/2014 Chang et al.
2015/0214885 A1 7/2015 Wu
(Continued)

FOREIGN PATENT DOCUMENTS

CL 2015001487 U1 10/2016
DE 202015003869 U1 8/2015
(Continued)

OTHER PUBLICATIONS

WO-2017162565-A1 English (Year: 2017).*
(Continued)

*Primary Examiner* — Bach T Dinh
(74) *Attorney, Agent, or Firm* — Bodman PLC

(57) ABSTRACT

A tracking device for solar panels (8) comprising a rotatable shaft (2) having a main extension along a first direction (D1) and being rotatable about the first direction (D1), the rotatable shaft (2) being configured to carry the solar panels (8), at least two support posts (4) having a main extension along a second direction (D2), the support posts (4) being anchored on or in a ground (6), and supporting the rotatable shaft (2), wherein the second direction (D2) is preferably at least substantially perpendicular to the first direction (D1), and a tension element (10), which is connected to the rotatable shaft (2) in between the at least two support posts (4), and to a first one of the support posts (4) such that a force acting on the rotatable shaft (2) in the first direction (D1) is redirected to the first one of the support posts (4) and via the support post (4) into the ground (6).

13 Claims, 6 Drawing Sheets

(58) Field of Classification Search
USPC .................................................. 136/243–265
See application file for complete search history.

(56) References Cited

U.S. PATENT DOCUMENTS

| | | | | |
|---|---|---|---|---|
| 2015/0372636 | A1 | 12/2015 | Menard | |
| 2015/0377520 | A1 | 12/2015 | Kufner | |
| 2021/0257964 | A1* | 8/2021 | Hudson | H02S 20/10 |

FOREIGN PATENT DOCUMENTS

| | | | | | |
|---|---|---|---|---|---|
| DE | 202018103053 | U1 | | 6/2018 | |
| EP | 2617063 | B1 | | 7/2014 | |
| KR | 20100096641 | A | * | 9/2010 | |
| KR | 20150093175 | A | | 8/2015 | |
| WO | WO-2009116701 | A1 | * | 9/2009 | F24J 2/5232 |
| WO | WO-2017162565 | A1 | * | 9/2017 | |

OTHER PUBLICATIONS

KR-20100096641-A English (Year: 2010).*
International Search Report for Application No. PCT/IB2022/058350; mailed Nov. 23, 2022; 3 pp.

* cited by examiner

TRACKING DEVICE FOR SOLAR PANELS

CROSS-REFERENCE TO RELATED APPLICATIONS

This application is a U.S. National Stage Application under 35 U.S.C. § 371 of International Application No. PCT/IB2022/058350, filed Sep. 6, 2022, which claims the benefit of and priority to European Patent Application No. EP 21198057.8, filed Sep. 21, 2021, the contents of which are hereby incorporated herein by reference in their entireties.

TECHNICAL FIELD

The invention concerns a tracking device for solar panels, in particular a tracking device for rotating solar panels such that their inclination is adapted to the varying inclination of the incident solar radiation during the day. In particular, the tracking device may be a single axis tracking device.

BACKGROUND

An important factor in the production of solar power systems is the reduction of material costs, since material costs typically constitute a large part of the total costs in the construction of solar power systems, and therefore in energy production. At the same time and to some extend contrary to the goal to reduce material costs, it is important to provide a stable, in particular windproof, configuration that can be maintained with low maintenance effort. In order to increase efficiency, solar power systems are often configured such that their solar panels follow the cycle of the sun during the day by utilizing tracking devices. This can in particular be achieved by tilting a row of solar panels around a single, usually roughly horizontal axis from facing east in the morning to west in the evening. Correspondingly, the requirement of stability is more difficult to achieve if tracking is involved. In the state of the art, systems are known that provide stability in the direction of the rotation of the solar panels. Such systems are, for example, disclosed in EP 2 617 063 B1 and DE 20 2018 103 053 U1.

SUMMARY

A problem that is still to be solved is the construction of solar power systems and/or tracking devices on sloped surfaces. At present, the construction of solar power systems and corresponding tracking devices on sloped surfaces with a slope of 5° or more requires a very solid tracking device using high material thicknesses, which is therefore very cost intensive. However, in particular when planning the construction of solar power systems in extensive areas, having to avoid sloped surfaces can pose a significant problem, e.g. because the available areas may not always be perfectly flat.

It is therefore an object of the invention to provide a tracking device which is suitable to be constructed on sloped surfaces while keeping additional construction costs, in particular material costs, reasonably low.

This object is achieved by a tracking device according to claim 1. Further advantages and features of the invention result from the dependent claims as well as the description and the attached figures.

According to an aspect of the invention, a tracking device for solar panels includes a rotatable shaft having a main extension along a first direction and being rotatable about the first direction. The rotatable shaft is configured to carry the solar panels. The tracking device also includes at least two support posts having a main extension along a second direction. The support posts are anchored on or in the ground and support the rotatable shaft. The second direction is preferably at least substantially perpendicular to the first direction. The tracking device further includes a tension element, which is connected to the rotatable shaft in between the at least two support posts, and to a first one of the support posts such that a force acting on the rotatable shaft in the first direction is redirected to the first one of the support posts and via the support post into the ground.

DETAILED DESCRIPTION

Figure 1:
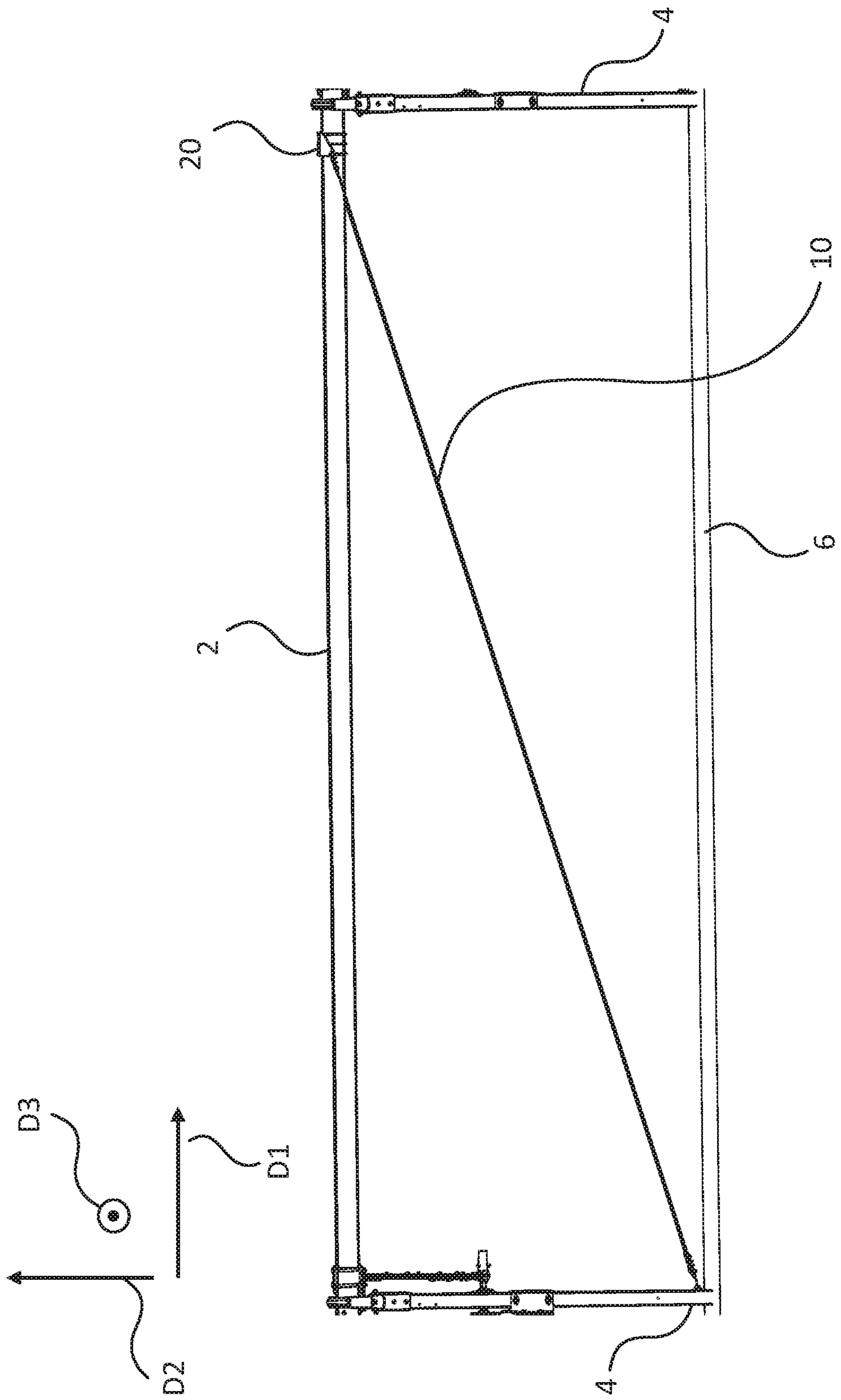
FIG. 1 shows a sideview of a tracking device for solar panels according to an embodiment of the invention.

According to the invention, a tracking device for solar panels is provided. The tracking device comprises a rotatable shaft having a main extension along a first direction and being rotatable about the first direction, the rotatable shaft being configured to carry the solar panels, at least two support posts having a main extension along a second direction, the support posts being anchored on or in a ground, and supporting the rotatable shaft, wherein the second direction is preferably at least substantially perpendicular to the first direction, and a tension element, which is connected to the rotatable shaft in between the at least two support posts, and to a first one of the support posts such that a force acting on the rotatable shaft in the first direction is redirected to the first one of the support posts and via the support post into the ground.

The tracking device is in particular configured to track the course of the solar radiation during the day by tilting the rotatable shaft around a single axis oriented along the first direction, so that the solar modules face east in the morning and west in the evening. The solar panels may be plate-shaped photovoltaic modules. Preferably the rotatable shaft is configured such that the solar panels may be attached to the rotatable shaft in a rotationally ridged manner, i.e. the solar panels are not rotatable relative to the rotatable shaft, for example a truss including cross beams may be rigidly attached to the rotatable shaft, wherein the solar panels are fastened to the truss. The tracking device preferably includes a drive mechanism adapted to rotate the rotatable shaft. For example, the rotatable shaft may be a drive shaft, in particular driven by at least one motor, which may be connected to the rotatable shaft at an end section of the rotatable shaft. Alternatively, the tracking device may comprise an additional drive shaft configured to drive the rotation of the rotatable shaft. The rotatable shaft may be driven by the additional drive shaft via a gear wheel, for example as disclosed in DE 20 2018 103 053 U1. The teachings of this utility model may be applied analogously to the tracking device according to this invention. The rotatable shaft may thus be rotatable in a range of +/−90° to 150°, preferably 110° to 130°, and more preferably 120°±5°.

The rotatable shaft may preferably be designed hollow, i.e. as a tube made of folded sheet metal. The hollow design allows the reduction of material costs and weight of the rotatable shaft. Its cross section preferably has a polygonal, in particular rectangular, preferably square shape. A polygonal cross section (i.e. not rotationally symmetric) allows for better mounting in a rotatable bearing. A rectangular cross section of the rotatable shaft may allow an easier and/or more reliable connection of the solar panels to the rotatable shaft.

The "first direction" is in particular the longitudinal direction of the rotatable shaft, in which the rotatable shaft has its greatest extension. The length of the rotatable shaft along the first direction may be in an order of magnitude of several meters or tens of meters, while the extension of the rotatable shaft transverse to the main extension may in an order of magnitude of a few cm, for example 5-50 cm, preferably 10-30 cm. For example, the tracking device may extend over tens of meters, e.g. 20 to 100 meters, in the first direction, wherein the rotatable shaft may either extend over this whole length or the tracking device may comprise several rotatable shafts, one behind the other, in the first direction.

The dimensions of the tracking device may be defined by the first (longitudinal) direction and by the second direction (which may be substantially vertical to the ground) and optionally by a third (transversal) direction. The support posts supporting the rotatable shaft are oriented along the second direction, which is preferably oriented substantially perpendicular to the first direction, and preferably substantially parallel to a surface normal of the ground. In this context "substantially" perpendicular may mean that the second direction varies from a perpendicular orientation compared to the first direction by 0°-10°, preferably by 0°-5°. In particular, the second direction may be perpendicular to the first direction within a margin of error due to constructional limitations. The third (transversal) direction may be oriented perpendicular to the first direction and to the second direction. The first direction and/or the third direction preferably extend in a plane, which is parallel to the ground. Preferably the support posts are configured such that they support the rotatable shaft in such a way that the rotatable shaft can rotate about its longitudinal axis extending along the first direction. A possible connection of the rotatable shaft to the support posts is described in the German utility model DE 20 2018 103 053 U1.

The support posts are anchored on or in the ground, in particular depending on the properties of the ground. For example, the support posts may be embedded or pushed into the ground. Alternatively or additionally, the support posts may be connected to the ground by additional fixing means. The support posts may have a length in the second direction, from the ground to the rotatable shaft, of about 1.5 meters to 3 meters, preferably of about 2.0±0.3 meters. Such a length may allow sufficient space for the tilting of the solar panels while at the same time allowing for relatively easy access during the mounting of the solar panels, possibly without the need for auxiliary means such as ladders. According to a preferred embodiment, the extension of the support posts along the first (longitudinal) direction may be smaller than an extension of the support post along the third (transversal) direction. For example, the extension of a cross-section of the support posts along the first direction may be in the range of 5 cm to 15 cm and along the third direction may be in the range of 20 cm to 30 cm. Advantageously such a configuration of the support posts may allow to minimize the material costs while taking into consideration the forces acting on the solar panels in the transversal direction, in particular due to wind. The support posts may comprise a bearing configured to support the rotatable shaft. The bearing may be made of plastic, e.g. pressed from plastic, in particular having a honeycomb or rectangular-shaped through hole adapted to fit around the rotatable shaft.

The tension element may connect the rotatable shaft to the support posts under tension, in particular a predetermined tension. The tension element may be connected to a first support post on one end, and to the rotatable shaft in between the first and a second support post at the other end, thereby preferably running at a small angle of about 5° to 30° to the first, longitudinal direction. Thereby, the tracking device is diagonally reinforced by the tension element. A force acting on the rotatable shaft in the first direction may for example be a gravitational force, e.g. if the tracking device is positioned on a sloped surface. Additionally and/or alternatively, the force acting on the rotatable shaft in the first direction may be a force due to construction or operation conditions and/or due to a force caused by the wind. Advantageously, the tension element according to the invention enables a stabilization of the tracking device in the first direction, which is efficient and can be realized with relatively low costs, in particular, when compared to a configuration, in which a stabilization is realized by using heavier support posts and heavier fastening means to support the rotatable shaft on the support posts such leading to a much higher material effort.

According to an embodiment, the ground may be sloped at least in between the at least two support posts, such that the first one of the support posts is positioned at a higher altitude than the second one of the support posts, and the first direction is also sloped. Thereby, a force acting on the rotatable shaft, namely at least part of the gravitational force (weight) of the rotatable shaft and the solar panels mounted thereon, may be redirected via the tension element to the first support, and from there into the ground, which allows higher slopes to be realized without reinforcing the posts, which would require more material expenditure. Preferably the slope of the first direction may be substantially equal to the average slope of the ground between the two posts, e.g. it may deviate from the slope of the ground by 0° to 10°, preferably by 0° to 5°. The tracking device may comprise additional pairs of support posts and corresponding tension elements, wherein in particular the slope of the ground beneath these additional pairs of support posts may vary and/or be zero in some cases, and greater than zero in some other cases. The tracking device may comprise several rotatable shafts for regions of the ground with different slopes correspondingly. Additionally, and/or alternatively the orientation of the first direction may vary for different sections of the tracking device depending on the slope of the ground, in particular the first direction may be parallel to the slope of the ground, or to the average slope of the ground in between two support posts, in each case. In the case of a varying slope of the ground there may be an interruption between rotatable shafts corresponding to the different sections of the differently sloped ground. The tracking device may preferably comprise an additional drive shaft which in particular comprises a cardan joint at each interruption of the rotatable shafts. Advantageously, the arrangement of the tracking device on a sloped surface is made possible via the tension element which stabilizes the tracking device in the first direction.

According to an embodiment, the slope/inclination of the sloped ground between the first and second support posts may on average be greater than 5°, preferably greater than 10°, more preferably greater than 20° up to 35°, preferably up to 25°, and/or the tracking device may be configured to be operated and/or positioned on sloped grounds having such an inclination. The tracking device being configured to allow for slopes of the ground greater than 5° may advantageously allow for a greater flexibility when planning the positioning and the construction of the tracking device on uneven or mountainous terrain. Being configured for a slope greater than 20° may allow placement of the tracking device even on hillsides. For example, the tension element may be configured to provide a tensioning force and/or support force of about 2 tons thus allowing the positioning of the tracking device on a slope of about 25°.

According to an embodiment, the tension element may comprise two, preferably at least substantially parallel, connecting sections along its extension, wherein the two connecting sections may be configured to automatically adjust their individual lengths along their extension and/or their individual relative positions with respect to the rotatable shaft when the rotatable shaft is rotated, such that a tension of the tension element is maintained. The connecting sections may preferably be spaced apart from each other in the third direction. In particular, the connecting sections may be positioned at opposing sides of the rotatable shaft as seen in the third direction. The connecting sections may preferably extend in a direction which is substantially perpendicular to the third direction, wherein substantially in this context may mean a deviation by 0-10°. Advantageously, the two connecting sections may thus ensure that the tension between the rotatable shaft and the support post remains mostly constant, even when the rotatable shaft is rotated. In particular, the length of one of the connecting sections may elongate by the same amount as the length of the other connecting section shortens when the rotatable shaft is rotated, or by such an amount the tension is maintained. According to an embodiment, the two connecting sections may be part of one cable, wherein the length of one connecting section is correspondingly shortened by the same amount by which the length of the other connecting section is elongated According to an embodiment, the connection of the tension element to the rotatable shaft may be closer to the second support post than to the first support post, in particular closer than 1 to 5 m to the second support post, for example at a distance of 0.1 to 1.5 m to the second support post, which may correspond to a distance of less than ⅛ of the distance between the two posts. The connection of the tension element to the rotatable shaft being closer to the second support post may allow for more efficient stabilization via the tension element because the orientation of the tension element may be closer to being parallel to the first direction than in a case where the connection is positioned further away from the second support post.

According to an embodiment, the tension element may be connected to a part of the support post which is close to the ground such that the part is a lower half, preferably a lower third, more preferably a lower fourth, of the extension of the support post between the rotatable shaft and the ground. In other words, the connection of the tension element to the support post may be positioned close to the ground. Positioning this connection close to the ground may allow for a particularly efficient diverting of the forces into the ground, without subjecting the first support post itself to higher forces, which might require reinforcement of the post.

According to an embodiment, the tension element may comprise at least one cable, in particular a metallic cable, as a connecting component. The cable, in particular a metallic cable, such as a wire cable or a wire rope, may provide a good flexibility during the construction of the tracking device and also a certain adaptability, for example to adjust the length of the tension element at the construction or later during maintenance work. Additionally, and/or alternatively the cable may be used for automatic adjustment of the connecting sections of the tension element as described above in order to automatically compensate for the rotation of the rotatable shaft.

According to an embodiment, the tension element may comprise a compensating element connecting the tension element to the one of the support posts and adapted to compensate for varying distances from the connection of the tension element to the rotatable shaft due to rotation of the rotatable shaft. The compensating element may be rotatable, twistable, tiltable or otherwise adaptable, in particular automatically when the shaft rotates, to allow an adaption for the rotation of the rotatable shaft about its longitudinal axis. Additionally, and/or alternatively the compensating element may be configured to allow for an adaption of the main extension of the tension element, in particular of the connecting sections of the tension element. Advantageously the rotation of the rotatable shaft may thus be compensated for, at least in part, via the compensating element.

According to a first embodiment, the compensating element may be a yoke connected to the support post in such a manner that it is rotatable about an axis of rotation, wherein the tension element may comprise two connecting components, in particular cables, which each have one end fixed to opposing end sections of the yoke and another end connected to the rotatable shaft. The yoke may in particular be a cross yoke. A yoke, in particular a cross yoke, is a particularly cost-efficient solution in order to compensate for the rotation of the rotatable shaft. The axis of rotation of the yoke may preferably be perpendicular to the third direction and/or the axis of rotation of the yoke may be substantially parallel to the second direction. The two connecting components may be equivalent to or the same as the connecting sections as described above. One end of each connecting component may be fixed to one of two end sections of the yoke, respectively, wherein the end sections of the yoke are in particular on opposing ends of the yoke as seen in the third direction. The other end of the connecting components of the tension element may be connected to the rotatable shaft at opposing ends as seen in the third direction, in particular on the same side as the connection of the respective connecting components to the yoke. The spacing between the connections of the two connecting components to the rotatable shaft may be equal or different to the spacing between the connections of the two connecting components at their other ends to the yoke. Preferably, the spacings are substantially equal, i.e. having up to 30% difference. Advantageously, the yoke may allow to compensate for the rotation the rotatable shaft which may cause varying distances between the connection to the rotatable shaft and the connection to the support post.

According to a second embodiment, the compensating element may be a pulley connected to the support post, wherein the tension element may comprise a cable the ends of which are connected to the rotatable shaft at opposing sides of the rotatable shaft, as seen along the third direction, wherein the cable may be guided around the pulley such that the cable is under tension. Preferably, the pulley may be connected to the support post in such a way that the pulley is rotatable about an axis of rotation, which is in particular perpendicular to the third direction. The pulley may be held by a holding element which is connected to the support post in such a manner that it is rotatable about an axis of rotation that is substantially parallel to the second direction and/or to the third direction. The pulley may allow a very flexible way to compensate for the rotation of the rotatable shaft. The axis of rotation of the pulley may be substantially perpendicular to the first direction and/or to virtual lines between the center of the pulley and the locations where the ends of the cables are located.

According to an embodiment, the tracking device may comprise a fastening element attached to the rotatable shaft, wherein the fastening element may comprise two fastening means, in particular holes, wherein the fastening means may be arranged on opposite sides of the rotatable shaft as seen along a third direction perpendicular to the first direction and the second direction, wherein the tension element may be attached to the fastening means. In particular, ends of the two connecting sections of the tension element as described above may be attached to the fastening means. Additionally and/or alternatively, two ends of a cable, the cable being part of the tension element, may be attached to the two fastening means. The arrangement of the fastening means on opposite sides of the rotatable shaft may advantageously allow to compensate for rotation of the rotatable shaft by lengthening/shortening the two connecting sections by equal amounts. This arrangement may allow for a particularly uniform compensation for the rotation of the rotatable shaft. The two fastening means may be positioned such that they are spaced apart from the rotatable shaft, such that the connecting sections of the tension element do not touch the rotatable shaft when the rotatable shaft is rotated. This avoids friction between the tension element and the rotatable shaft and thus to minimize damage and/or unnecessary energy loss due to the friction.

Additionally and/or alternatively, the two fastening means may be offset by the same length from the rotational axis of the rotatable shaft as seen along the third direction, and/or the fastening means may be positioned on a line along the third direction which passes through the rotational axis of the rotatable shaft. The offset of the two fastening means being the same for both fastening means may have the advantage that when the rotatable shaft is rotated and/or tilted, the tension element, in particular the connecting sections and/or the cables of the tension element, may maintain the same tension and the connecting sections and/or the cable are not loosened and/or further tensioned during the process. In other words, the fastening means may be positioned at the central line of the rotatable shaft. In particular when combined with the offset of the two fastening means being same on both sides, the connection of the tension element to the rotatable shaft may be corresponding to a connection of the tension element to a central axis of the rotatable shaft without the actual need to contact the central axis of the rotatable shaft with the tension element.

According to an embodiment, the fastening element may comprise an angled plate with three differently oriented sections. A central section of the angled plate may have a surface normal parallel to the second direction and two outer sections of the angled plate may be adjacent to the central section and/or have a surface normal oriented along the second direction and the third direction. The two outer sections may each comprise one of the two fastening means, in particular such that the fastening means are positioned on a line along the third direction which passes through the rotational axis of the rotatable shaft. The outer sections may each be angled with respect to the central section at an angle of 25° to 35°, in particular such that the ends of the outer sections are closer to the ground than the central section. Advantageously, the angled plate may provide a simple solution in order to arrange and/or position the fastening means and in particular to position the holes on opposite sides of the rotatable shaft and/or spaced apart from the rotatable shaft. An angle of 25° to 35° may provide a particularly efficient combination of spacing the fastening means apart from the rotatable shaft and arranging the fastening means at the height of the center of the rotatable shaft. The central section and/or the outer sections may preferably be plate-shaped. A plate shaped central section of the angled plate may allow for a particularly effective connection of the angled plate to the rotatable shaft.

Preferably, the fastening element may comprise a fixing means which fixes the fastening element to the rotatable shaft. The fixing means may in particular comprise at least one clamping device that clamps the fastening element to the rotatable shaft. The clamping device may for example be bow-shaped and/or u-shaped. Advantageously, the clamping device may provide a particularly simple solution to fix the fastening element to the rotatable shaft. The fixing means and/or the clamping device may be attached and/or attachable to the angled plate, in particular to the central section of the angled plate. In particular, the fixing means may fix the rotatable shaft to the central section of the angled plate.

According to an embodiment, the tracking device may comprise at least two tension elements, wherein the at least two tension elements may be connected to the rotatable shaft at different locations, in particular in between two different pairs of support posts. Providing two or more tension elements may allow a stabilization of the rotatable shaft and/or of the tracking device at different sections of the tracking device. Preferably, a first extension element may extend from one of the support posts to a position on the rotatable shaft which is spaced apart from said support post in positive first direction, wherein a second extension element may extend from one of the support posts to a position on the rotatable shaft which is spaced apart from said support post in negative first direction. In other words, two tension elements may provide a stabilization of the tracking device in both directions parallel to the first direction. This may for example be advantageous in the case of heavy wind in order to protect the tracking device in both directions from the wind. Additionally and/or alternatively, the tracking device may comprise multiple, in particular more than three support posts and tension elements. Preferably the support posts and/or the tension elements may be arranged along a line extending in the first direction. Each tension element may be connected to a different position of the rotatable shaft and/or to a different support post. The distance between neighboring support posts may depend on the individual requirements such as an expected wind force or the properties of the ground. Accordingly, the distance between neighboring support posts may vary and/or the spacing between tension elements may vary. The tracking device may comprise multiple rotatable shafts, wherein preferably all of the rotatable shafts may be oriented parallel to the slope of the ground. The multiple rotatable shafts and/or an additional drive shaft may be connected via a cardan joint.

Embodiments of the invention are now described with reference to the attached figures. Similar or corresponding components are designated with the same reference signs. The following description serves only to clarify the invention and should not be construed as limiting the appended claims to any of the embodiments.

FIG. 1 shows a sideview of a tracking device for solar panels according to an embodiment of the invention. The tracking device comprises a rotatable shaft 2 which extends in a first direction D1. The rotatable shaft 2 is supported by two support posts 4 which are anchored to the ground 6. Both support posts 4 extend in a second direction D2, which, in this case is, oriented perpendicular to the first direction D1. In order to counteract forces that act on the rotatable shaft 2 in the first direction D1, the tracking device comprises a tension element 10 which is connected to the rotatable shaft 2 via a fastening element 20. The tension element 10 extends between the rotatable shaft 2 and one of the support posts 4. A force that acts on the rotatable shaft 2 in the direction of the first direction D1 is thus redirected via the tension element 10 to the support post 4 and from there into the ground 6.

Figure 2:
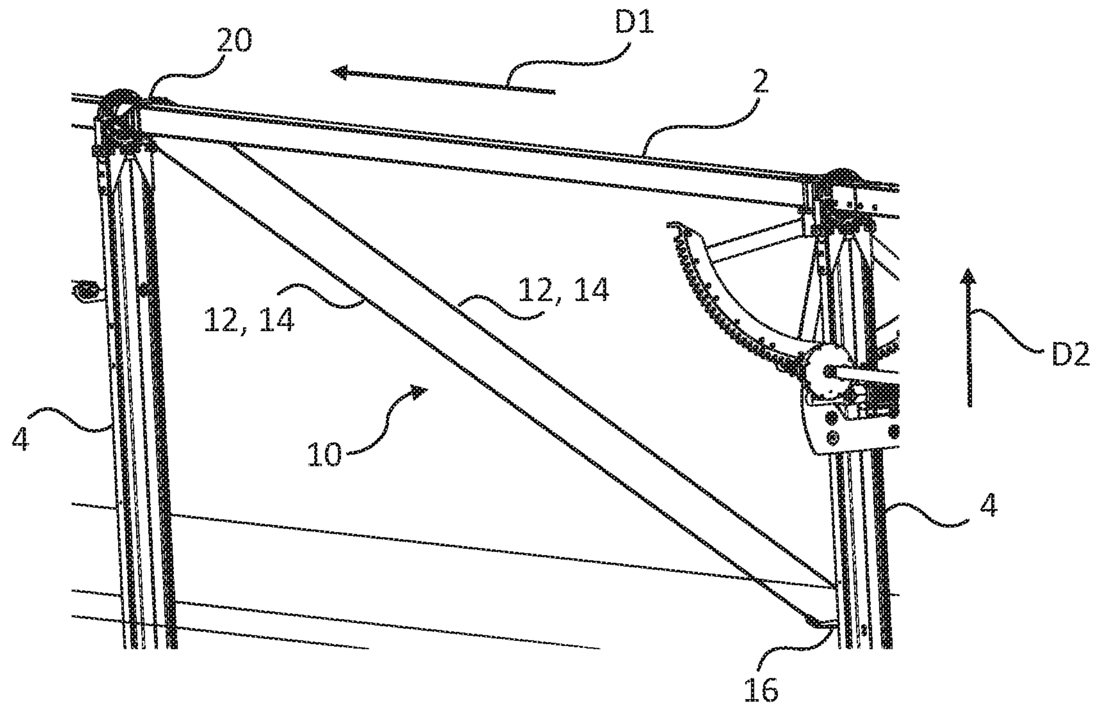
FIG. 2 shows a perspective view of a tracking device according to an embodiment of the invention.

FIG. 2 shows a perspective view of a tracking device according to an embodiment of the invention. The embodiment shown here may be the same embodiment as shown in FIG. 1. In this perspective view it is visible that the tension element 10 comprises two connecting sections 12, which connect the rotatable shaft 2 to the support post 4. In this case the connecting sections 12 are cables 14 which are connected to the support post 4 on the right side via a compensating element 16 which, in this embodiment, is a yoke.

Figure 3:
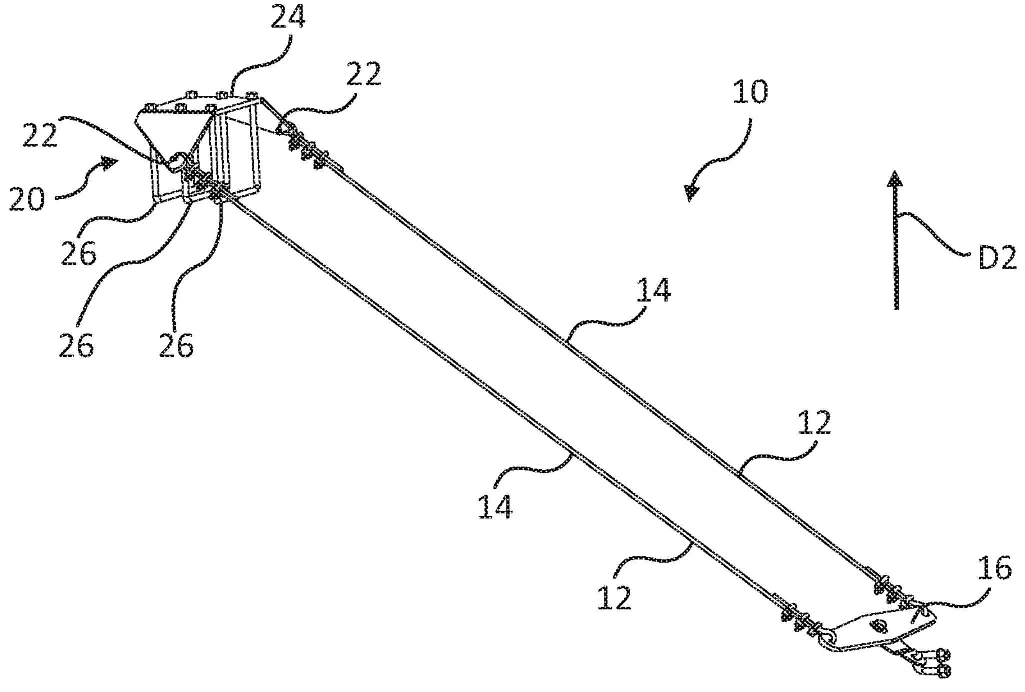
FIG. 3 shows a perspective view of a fastening element and a tension element according to an embodiment of the invention.

The embodiment of the tension element 10 of FIG. 2 is shown in more detail in FIG. 3. In FIG. 3 the tension element 10 is connected to a fastening element 20. The fastening element 20 may fasten the tension element 10 to the rotatable shaft 2. In this embodiment, the tension element 10 comprises a compensating element 16 that is a yoke. The fastening element 20 on the other hand comprises an angled plate 24 which has two holes as fastening means, both on the left side and on the right side of the fastening element 20. A cable 14 spans from the left side of the yoke 16 to the left side of the angled plate 24 and another cable 14 spans from the right side of the yoke 16 to the right side of the angled plate 24. In this embodiment, a rotation of the rotatable shaft 2 is automatically compensated for by turning the yoke 16 about an axis that is about perpendicular to the extension of the cables 14 between the yoke 16 and the fastening element 20. The axis of rotation of the yoke 16 may for example also be parallel to the second direction D2 or be oriented anywhere between these two options. If the rotatable shaft 2 is rotated such, that the fastening means 22 on the left side is lowered while the fastening means 22 on the right side is elevated, the fastening means 22 on the left side 22 will be closer to the ground 6 and thus closer to the yoke 16 while the fastening means 22 on the right side 22 will be further away from the ground 6 and thus further away from the yoke 16. This is automatically compensated for by the yoke 16 rotating such that the left side of the yoke 16 is rotated backwards while the right side of the yoke 16 is rotated forwards. Hence, the distance between the connection of the cable 14 to the fastening means 22 and the respective connection of the cable 14 to the yoke 16 remains constant, even if the rotatable shaft 2 is rotated or tilted.

Figure 4:
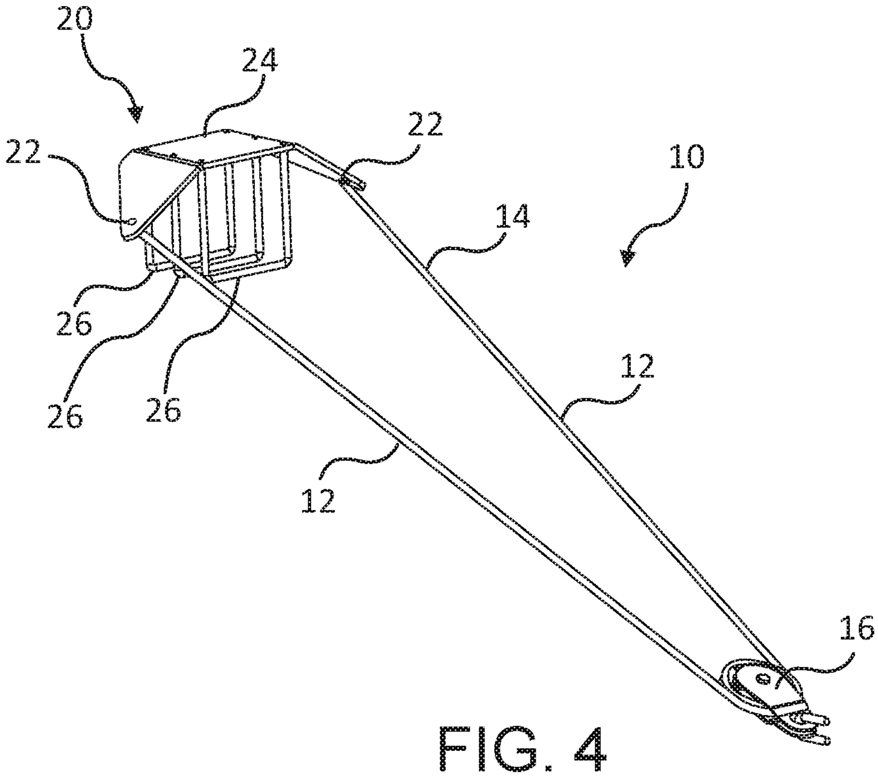
FIG. 4 shows a perspective view of a fastening element and a tension element according to another embodiment of the invention.

FIG. 4 shows another embodiment of the tension element 10 which is connected to an equivalent fastening element 20 as the tension element 10 of FIG. 3. In the embodiment shown in FIG. 4, the yoke is replaced by a pulley 16. Consequently, in this embodiment, the tension element 10 comprises only one cable 14 which is guided around a guide rail of the pulley 16. The cable 14 goes from the fastening means 22 on the left side of the angled plate 24 around the pulley 16 to the fastening means 22 on the ride side of the angled plate 24. In this embodiment a rotation of the rotatable shaft 2 can be compensated with the help of the pulley 16. If the rotatable shaft 2 is rotated, such that the left side of the angled plate and thus the fastening means 22 on the left side is lowered, the distance between the fastening means 22 and the pulley 16 will be reduced, while at the same time the fastening means 22 on the right side will be higher and the distance between the fastening means 22 on the right side to the pulley will be greater. Due to the pulley 16, this can be compensated for, in that the portion of the cable 14 on the left side corresponding to the connecting section 12 on the left side is shortened, while the portion of the cable 14 on the right side corresponding to the connecting section 12 is elongated correspondingly.

Figure 5:
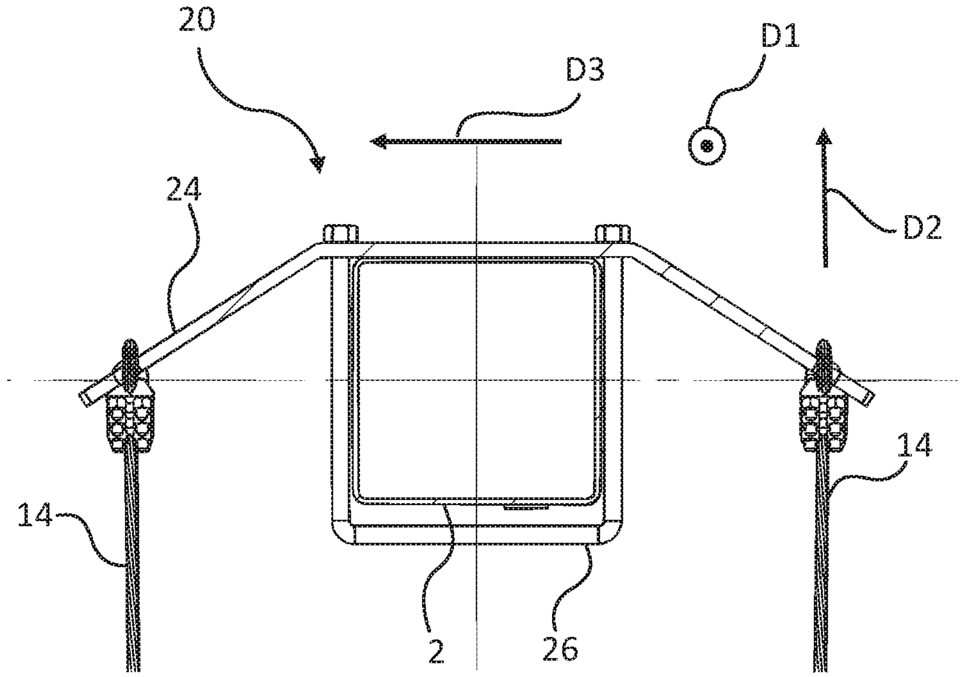
FIG. 5 shows front view of a fastening element connecting cables of a tension element to a rotatable shaft according to an embodiment of the invention.

In both, the embodiment of FIG. 3 and the embodiment of FIG. 4, the fastening element 20 is fixed to the rotatable shaft 2 via clamping elements 26. The fastening element 20 and the connection of the fastening element 20 to the rotatable shaft 2 is shown in more detail in FIG. 5. Here it can be seen that the clamping element 26 is shaped in the form of a U and fastened to the rotatable shaft 2 by screwing the clamping element 26 to the angled plate 24, which is positioned above the rotatable shaft 2. In this embodiment there is a gap between the lower side of the rotatable shaft 2 and the clamping element 26. Alternatively, this gap may be closed in order to further improve the connection between the rotatable shaft 2 and the fastening element 20. As can be seen in FIG. 5, the ends of the cable 14 are connected to the angled plate 24 in such a way that the cables 14 are spaced apart from the rotatable shaft 2 by a certain distance and also such that the point where the cables 14 are connected to the angled plate 24 is positioned at half the height of the rotatable shaft 2 as seen in the second direction D2. This ensures that, on the one hand, the connection of the tension element 10 to the rotatable shaft 2 has the same effect as if the tension element 10 was connected to the center of the rotatable shaft 2. Additionally, by spacing apart the cables 14 from the rotatable shaft 2 it is ensured that the cables do not touch the rotatable shaft 2 or the clamping element 26. Thus, friction between the cables 14 and the clamping element 26 of the rotatable shaft 2 can be avoided, which reduces loss of energy and possible damage to the cables 14, the fastening element 20, or to the rotatable shaft 2.

Figure 6:
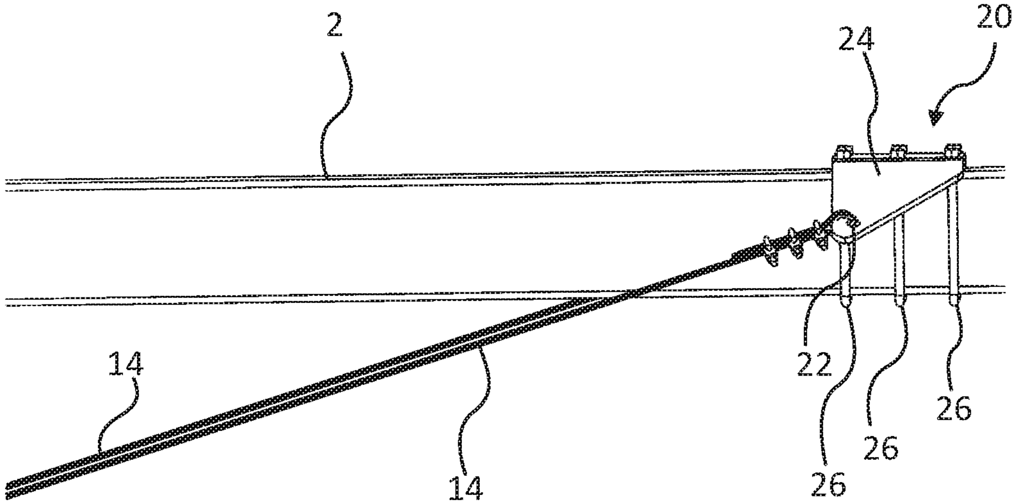
FIG. 6 shows a sideview of the connection of the cables of the tension element to the angled plate of the fastening element according to an embodiment of the invention.

FIG. 6 shows a sideview of the connection of the cables 14 of the tension element 10 to the angled plate 24 of the fastening element 20. Here, it can be recognized particularly well, that the cables 14 are connected to fastening element at half the height of the rotatable shaft 2. The outer section of the angled plate is shaped in the form of a triangle in this embodiment. The angled plate 24 is fastened to the rotatable shaft 2 via clamping elements 26 which are u-shaped and enclosed tightly around the rotatable shaft 2.

Figure 7:
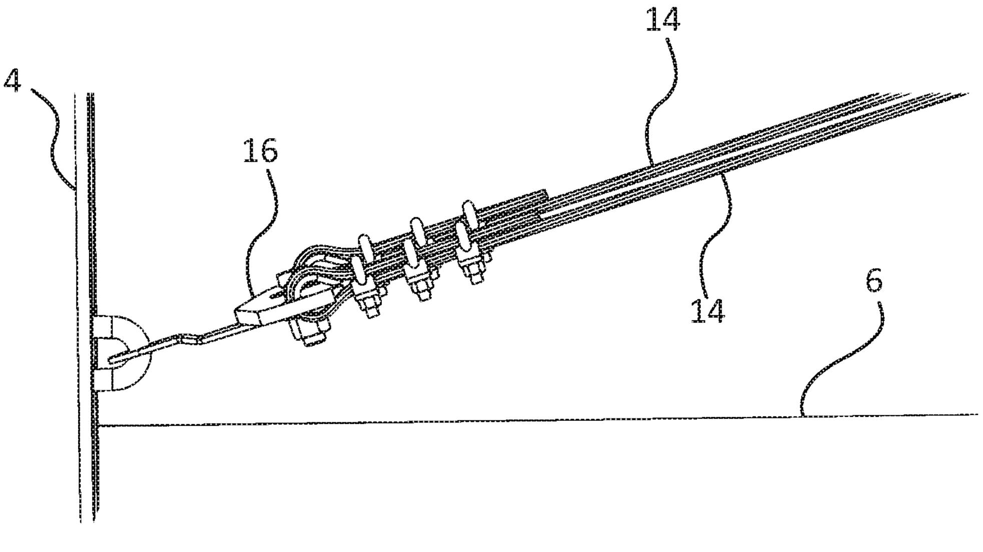
FIG. 7 shows a perspective view of compensating element according to an embodiment of the invention connecting cables of a tension element to a support post.

FIG. 7 shows a compensating element 16 according to the invention, which is a yoke in this case, connecting cables 14 to a compensating element 16 to a support post 4 just above the ground 6.

Figure 8:
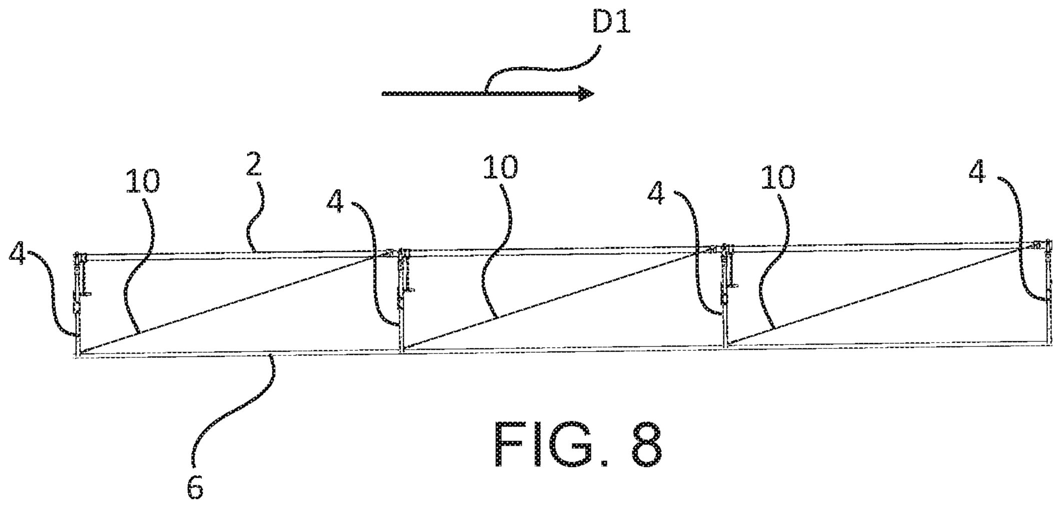
FIG. 8 shows a side view of a tracking device according to an embodiment of the invention.

FIG. 8 shows a side view of a tracking device according to an embodiment of the invention. In this embodiment, the tracking device comprises several tension elements which connect the rotatable shaft 2 to different support posts 4. In this example, there are shown three tension elements 10 and four support posts 4. However, there may be even a greater number of tension elements 10 and/or support posts 4 and it is also conceivable that there are tension elements 10 between some pairs of support posts and no tension elements 10 between other pairs of support posts 4. The number of tension elements 10 may in particular be adapted to the requirements which might be different at different sections of the tracking device due a varying slope at the different sections of the tracking device as well as by the expected strength of the wind in the area where the tracking device is installed.

Figure 9:
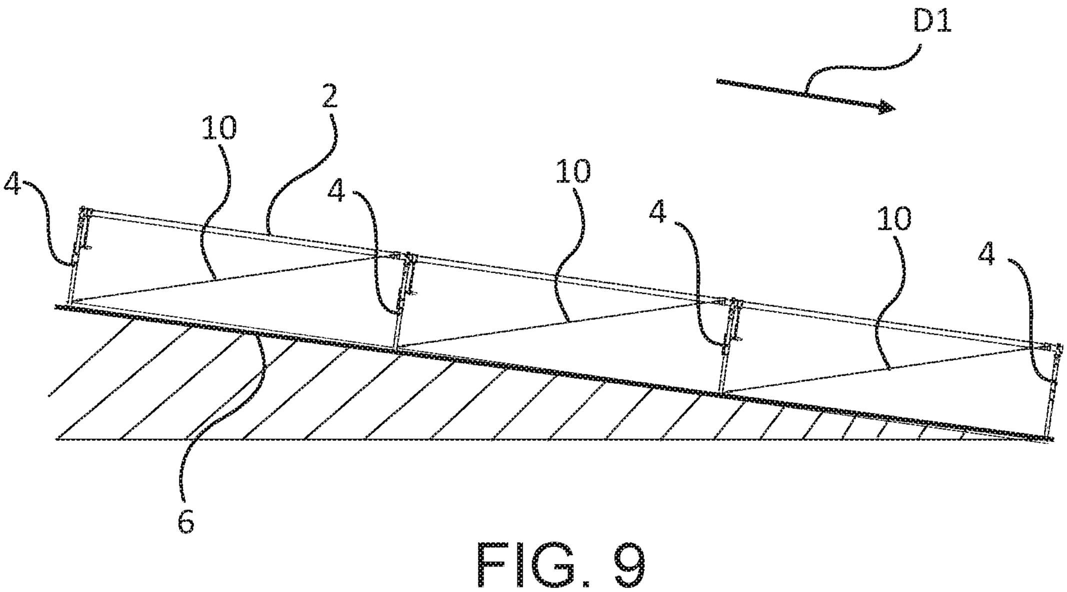
FIG. 9 shows a side view of a tracking device on a sloped ground according to an embodiment of the invention.

An example of an application of an embodiment of the tracking device according to the invention is shown in FIG. 9. Here, the tracking device is placed on a sloped ground 6. In this example the slope of the ground is about 8°. The slope of the rotatable shaft 6 is substantially equal to the slope of the ground 6 and the support 4 posts are oriented perpendicular to the ground 6 and to the rotatable shaft 2. Due to the slope of the ground 6 and the rotatable shaft 6, a gravitational force is acting on the rotatable shaft such that a resulting force is pulling the rotatable shaft in the first direction D1. Usually, neither the support posts 4 nor the bearing of the support posts 4, on which the rotatable shaft is supported, are strong enough on their own to counteract this resulting force. Therefore, the tension elements 10 are used in this case to compensate for this force acting on the rotatable shaft 2 in the first direction D1 and redirect the force into the ground 6. It is conceivable to have a tracking device which comprises sloped areas and areas without slope and/or different areas with differently sloped ground 6. Correspondingly the placement and/or use of the tension element 10 may be varied according to the slope of the respective ground 6 at each position.

Figure 10:
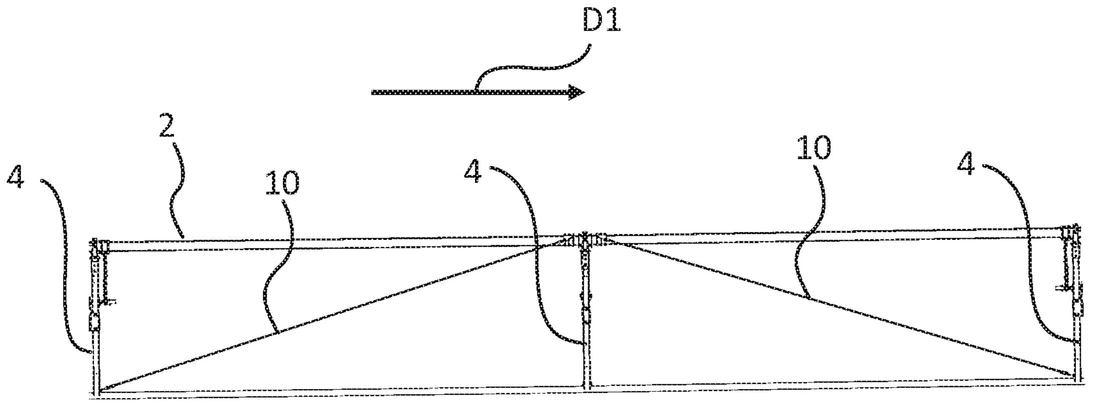
FIG. 10 shows a side view of a tracking device according to another embodiment of the invention.

FIG. 10 shows a side view of a tracking device according to another embodiment of the invention. In this embodiment there are two tension elements 10 which secure the rotatable shaft 2 in two different directions. Hence, one of the tension elements 10 extends from one of the support posts 4 to a position on the rotatable shaft 2 which is spaced apart from that support post in a first positive direction, while the other one of the tension elements 10 extends from another one of the support posts 4 to a position on the rotatable shaft 2 which is spaced apart from that other support post 4 in a negative first direction D1. This embodiment may for example be useful in order to counteract the forces of the wind acting on the rotatable shaft 2 sometimes in the first direction D1 and sometimes against the first direction D1.

Figure 11:
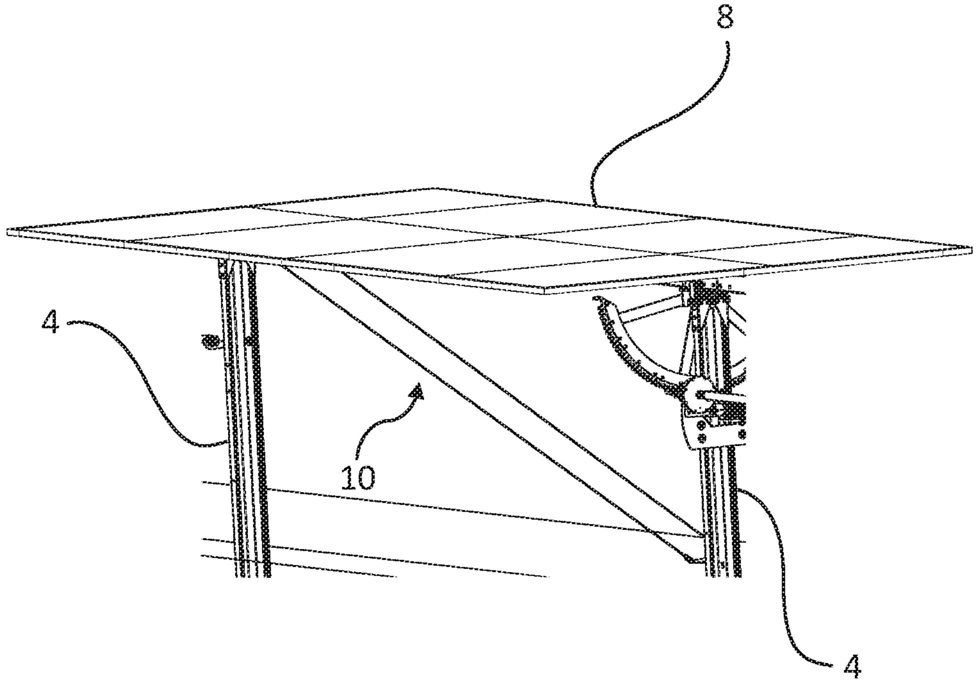
FIG. 11 shows a perspective view of a tracking device according to an embodiment of the invention onto which solar panels are installed.

FIG. 11 shows a perspective view of a tracking device according to an embodiment of the invention onto which solar panels 8 are already installed. The solar panels 8 may be rotated or tilted according to the course of the sun during the day via rotation of the rotatable shaft 2. The embodiment may otherwise be the same embodiment as the one shown in FIG. 2.

The invention claimed is:

1. A tracking device for solar panels comprising a rotatable shaft having a main extension along a first direction and being rotatable about the first direction, the rotatable shaft being configured to carry the solar panels, the first direction being a longitudinal direction of the rotatable shaft, at least two support posts having a main extension along a second direction, the support posts being anchored on or in a ground, and supporting the rotatable shaft, wherein the second direction is at least substantially perpendicular to the first direction, and a tension element, which is connected to the rotatable shaft in between the at least two support posts, and to a first one of the support posts such that a force acting on the rotatable shaft in the first direction is redirected to the first one of the support posts and via the support post into the ground, wherein the tension element comprises two connecting sections along its extension, wherein the two connecting sections are configured to automatically adjust their individual lengths along their extension and/or their individual relative positions with respect to the rotatable shaft when the rotatable shaft is rotated, such that a tension of the tension element is maintained, wherein the tension element comprises at least one cable as a connecting component, wherein the tension element is connected to the first one of the support posts at one end, and to the rotatable shaft in between the first one of the support posts and a second support post at the other end, thereby running at an angle of about 5° to 30° to the first direction.

2. The tracking device of claim 1, wherein the ground is sloped at least in between the at least two support posts, such that the first one of the support posts is positioned at a higher altitude than the second one of the support posts, and the first direction is also sloped.

3. The tracking device of claim 2, wherein the slope of the sloped ground between the first and second support posts is on average greater than 5°.

4. The tracking device of claim 1, wherein the connection of the tension element to the rotatable shaft is closer to the second support post than to the first support post.

5. The tracking device of claim 1, wherein the tension element is connected to a part of the support post which is close to the ground such that the part is a lower half of the extension of the support post between the rotatable shaft and the ground.

6. The tracking device of claim 1, wherein the tension element comprises a compensating element connecting the tension element to the first one of the support posts and adapted to compensate for varying distances from the connection of the tension element to the rotatable shaft due to rotation of the rotatable shaft.

7. The tracking device of claim 6, wherein the compensating element is a yoke connected to the support post in such a manner that it is rotatable about an axis of rotation, wherein the tension element comprises two connecting components, which each have one end fixed to opposing end sections of the yoke and another end connected to the rotatable shaft.

8. The tracking device of claim 6, wherein the compensating element is a pulley connected to the support post, wherein the tension element comprises a cable the ends of which are connected to the rotatable shaft at opposing sides of the rotatable shaft, wherein the cable is guided around the pulley such that the cable is under tension.

9. The tracking device of claim 1, wherein the tracking device comprises a fastening element attached to the rotatable shaft, wherein the fastening element comprises two fastening means, wherein the fastening means are arranged on opposite sides of the rotatable shaft as seen along a third direction perpendicular to the first direction and the second direction, wherein the tension element is attached to the fastening means.

10. The tracking device of claim 9, wherein the two fastening means are offset by the same length from the rotational axis of the rotatable shaft as seen along the third direction, and/or wherein the fastening means are positioned on a line along the third direction which passes through the rotational axis of the rotatable shaft.

11. The tracking device of claim 9, wherein the fastening element comprises an angled plate with three differently oriented sections, wherein a central section has a surface normal that is parallel to the second direction, wherein two outer sections are adjacent to the central section and have a surface normal oriented along the second direction and the third direction, wherein the two outer sections each comprise one of the two fastening means.

12. The tracking device of claim 1, wherein the tracking device comprises at least two tension elements, wherein the at least two tension elements are connected to the rotatable shaft at different locations, namely in between two different pairs of support posts.

13. The tracking device of claim 12, wherein a first tension element extends from one of the support posts to a position on the rotatable shaft which is spaced apart from said support post in positive first direction, wherein a second tension element extends from one of the support posts to a position on the rotatable shaft which is spaced apart from said support post in negative first direction.

* * * * *